(12) United States Patent
Almaraz et al.

(10) Patent No.: US 7,116,220 B2
(45) Date of Patent: Oct. 3, 2006

(54) SEAT BELT LATCH SENSOR ASSEMBLY

(75) Inventors: Jose L Almaraz, Chihuahua (MX); Daniel A. Martinez, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 106 days.

(21) Appl. No.: 10/438,556

(22) Filed: May 15, 2003

(65) Prior Publication Data

US 2004/0227626 A1 Nov. 18, 2004

(51) Int. Cl.
*B60Q 1/00* (2006.01)

(52) U.S. Cl. .............. 340/457.1; 24/68 SB; 24/69 SB; 340/425.5

(58) Field of Classification Search ............ 340/457.1, 340/425.5; 24/633–641, 68 SB, 69 SB; 180/368
See application file for complete search history.

(56) References Cited

U.S. PATENT DOCUMENTS

| | | | | |
|---|---|---|---|---|
| 5,752,299 A | * | 5/1998 | Vivacqua et al. ............. | 24/633 |
| 5,898,366 A | * | 4/1999 | Brown et al. ............. | 340/457.1 |
| 5,960,523 A | * | 10/1999 | Husby et al. ................. | 24/633 |
| 5,966,784 A | * | 10/1999 | Arbogast et al. ............. | 24/633 |
| 6,002,325 A | * | 12/1999 | Conaway ................. | 340/384.1 |
| 6,175,304 B1 | * | 1/2001 | Becker .................... | 340/457.1 |
| 6,329,893 B1 | * | 12/2001 | Furukawa et al. .......... | 335/205 |
| 6,340,176 B1 | | 1/2002 | Webber et al. | |
| 6,381,815 B1 | * | 5/2002 | Yamaguchi et al. .......... | 24/633 |
| 6,438,810 B1 | | 8/2002 | Rogers, Jr. et al. ........... | 24/641 |
| 6,502,860 B1 | | 1/2003 | Siegfried et al. ........ | 280/801.1 |
| 6,554,318 B1 | | 4/2003 | Kohut et al. ............. | 280/801.1 |
| 6,572,147 B1 | | 6/2003 | Webber et al. | |
| 6,725,509 B1 | | 4/2004 | Lee et al. ...................... | 24/641 |
| 6,729,427 B1 | * | 5/2004 | Do ............................. | 180/268 |
| 2003/0213288 A1 | | 11/2003 | Mireles et al. ............. | 73/61.43 |
| 2004/0060761 A1 | | 4/2004 | Almarez et al. ............ | 180/268 |
| 2004/0226767 A1 | | 11/2004 | Martinez et al. ............ | 180/268 |

FOREIGN PATENT DOCUMENTS

WO WO 02/06092 1/2002

* cited by examiner

*Primary Examiner*—Jeffery Hofsass
*Assistant Examiner*—George Bugg
(74) *Attorney, Agent, or Firm*—Jimmy L. Funke

(57) ABSTRACT

A mechanical engagement system such as a seat belt assembly includes a housing and a slider slidably received within the housing, the slider is configured for movement between a first position and a second position within the housing. A single magnet is associated with the slider for slidable movement therewith while a hall effect device is fixed relative to the housing. The hall effect device is fixed relative to the housing and aligned with at the single magnet when the slider is in the second position. The hall effect device is configured to generate an output signal indicative of a latch condition of the mechanical engagement system as applied to the sensor assembly.

12 Claims, 6 Drawing Sheets

SEAT BELT LATCH SENSOR ASSEMBLY

TECHNICAL FIELD

The present invention relates generally latching systems such as a safety restraint system, and more particularly to a seat belt latch sensor assembly that can detect engagement of a seat belt and provide an electrical signal in response thereto.

BACKGROUND

Certain latching systems, or any other type of mechanical engagement system, typically require a way to determine when full engagement has been achieved between two mechanical parts. These mechanical parts may both be movable or one can remain stationary relative to the other. One example of such systems requiring accurate and dependable engagement sensing schemes are vehicle restraint systems.

Vehicles are provided with seat restraints systems such as seat belts in order to restrain occupants in the seat. The proper engagement and operation of the seat belt ensures the safety of a driver and his or her occupants.

Seat belts often incorporate sensors that provide data to other vehicle restraint vehicle systems such as airbags. Deployment of an airbag may partially depend on the information supplied by the sensor in the seat belt, such as a sensor may determine the presence of an occupant on the seat. In some applications, it may be desirable to suppress the deployment of an air bag. For example, if an airbag corresponding to an unoccupied seat deploys, an unnecessary repair expense occurs. In addition, such sensors can also be used to indicate that the seat belt is properly tightened and properly engaged or latched for proper reliance thereon. Determination of a latched, or unlatched, condition of the belt may also be used to determine how the airbag should be deployed. A latched condition will deploy the airbag softly, while still protecting against injury due to impact. An unlatched condition will deploy the airbag at a much harder and quicker pace since this is an indication of an occupant not wearing a safety belt.

Most of the sensors employed today as latch engagement detectors are of a mechanical switch type. These mechanical switches involve at least two pieces that are in and out of continuous frictional contact, thus producing wear and misalignment with aging. Wear and misalignment between the mechanical pieces will eventually result in a latch detection failure.

Accordingly, there is a need for a seat belt latch sensor assembly that minimizes or eliminates one or more of the problems set forth above.

SUMMARY OF INVENTION

It is an object of the present invention to minimize or eliminate one or more of the problems set forth above on any mechanical engagement system. To describe the advantages of this invention, the seat belt latch assembly application will be described in detail and used throughout this document.

One advantage of the present invention is that it allows elimination of a mechanical contact switch subject to wear and failure to indicate positive latch engagement with a seat belt sensor assembly of the seat belt system. According to the invention, a seat belt sensor assembly comprises a housing, a slider slidably received within the housing, the slider being configured for movement between a first position and a second position within the housing, a single magnet associated with the slider for slidable movement therewith, a Hall effect device being fixed relative to the housing when the slider is in the second position, the Hall effect device being configured to produce an output signal, the output signal being indicative of a latch condition of the seat belt as applied to said sensor assembly. A biasing member is preferably included for providing an urging force to the slider, the urging force urging the slider into the first position.

The above-described and other features and advantages of the present invention will be appreciated and understood by those skilled in the art from the following detailed description, drawings, and appended claims.

BRIEF DESCRIPTION OF THE DRAWINGS

The present invention will now be described by way of example, with reference to the accompanying drawings, in which.

DETAILED DESCRIPTION OF THE PREFERRED EMBODIMENTS

Figure 1:
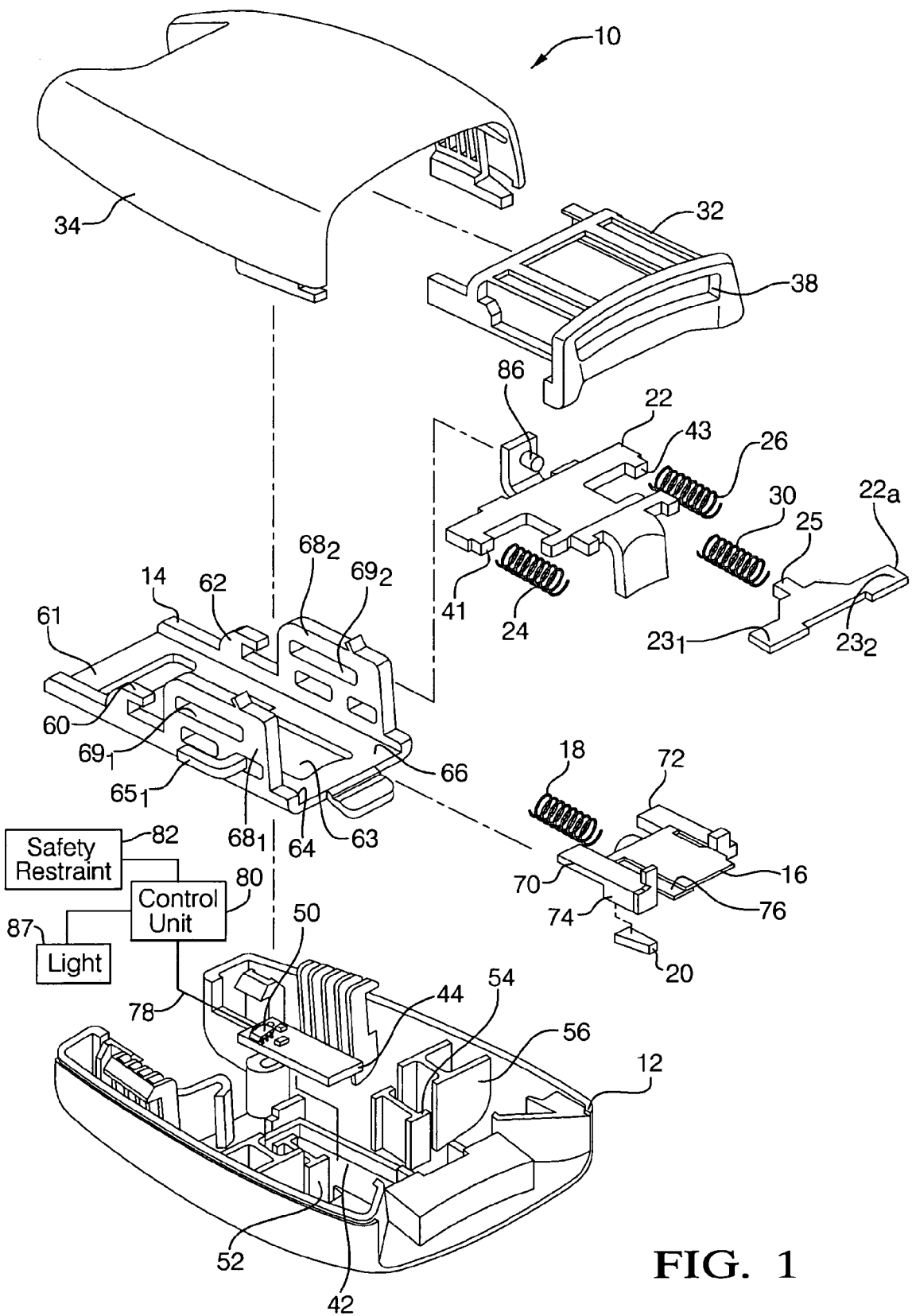
FIG. 1 is an assembly view of the seat belt sensor assembly used in accordance with the present invention.

Referring now to the drawings wherein like reference numerals are used to identify identical components, FIG. 1 is an assembly view of the seat belt sensor assembly generally indicated by 10. The seat belt sensor assembly 10 includes a bottom cover 12, a buckle frame 14, a slider 16, spring 18, a magnet 20, hook portions 22 and 22a, biasing members 24 and 26, a spring 30, a release button 32 and an upper cover 34.

Bottom cover 12 and upper cover 34 form a housing 40, which may be constructed out of a lightweight, easily molded material such as plastic. Bottom cover 12 includes cavity 42 configured in size and shape to receive a printed circuit board (PCB) 44. PCB 44 may be mounted in cavity 42, for example, as shown. Printed circuit board 44 includes a Hall effect switch or Hall effect device 50 or other switching sensor capable of detecting a magnetic field. In an exemplary embodiment, device 50 is a programmable Hall effect switch. Device 50 is arranged so that it can operably align with magnet 20 to detect when a seat belt is engaged, as described in greater detail below. As illustrated, bottom cover 12 also includes I-beam like structures 52, 54, and 56 that retain buckle frame 14 when slider 16, hook 22,22a, spring 18 and biasing members 24 and 26 are assembled to buckle frame 14.

Figure 2:
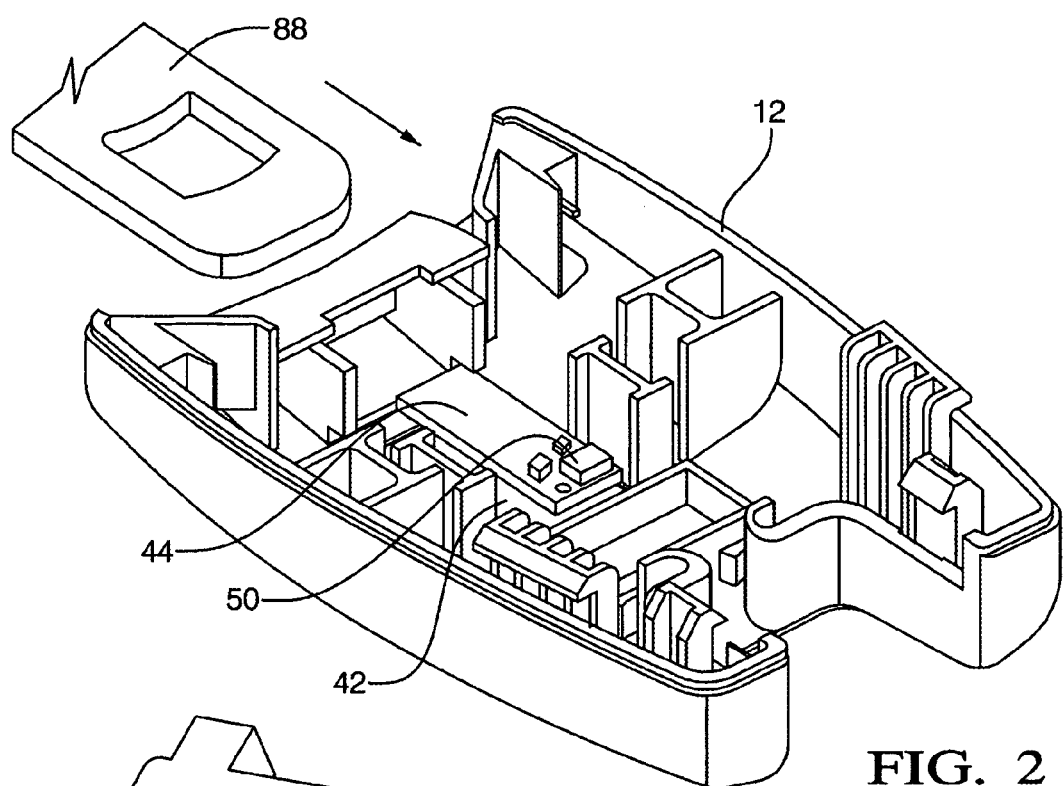
FIG. 2 is a simplified, perspective view of the seat belt sensor bottom cover in accordance with the present invention.

With reference to FIG. 2, a simplified, perspective view of the bottom cover 12 is provided. Bottom cover 12 includes cavity 42 whereby PCB 44 is housed. PCB 44 is standard type that allows electrical components to be surface mounted. A surface mounted switch or device 50 is used to detect a positive latch condition. A tongue 88 is shown in the unlatched position. It should be understood that the orientation of PCB 44 as shown in FIG. 2 is exemplary only and not limiting in nature. Many other orientations with respect to the placement of PCB 44 in the bottom cover 12 are achievable and are known to those of ordinary skill in the art and are consistent with the teachings of the present invention, which relate principally to the inventive arrangement. Nonetheless, the following may be taken as a non-limiting illustrated embodiment.

Referring again to FIG. 1, buckle frame 14 is generally rectangular shaped adapted to fit inside housing 40 and includes a generally planar base 61. Buckle frame 14 provides the means for receiving the assembly of slider 16 and hook portions 22, 22a. Buckle frame 14, as shown, also includes a pair of J-shaped extensions 60, 62. Buckle frame 14 also includes a centrally-disposed opening 63 defined in-part by a pair of opposing ledges 64 and 66. Opening 63 has a preselected lateral width, whose function will be described in greater detail below. Buckle frame 14 further includes a pair of side rails $68_1$ and $68_2$ extending generally normally from base 61, and having a preselected lateral width between inner surfaces thereof. Buckle frame 14 further includes elongated slots $69_1$ and $69_2$, which are formed in either side of side rails $68_1$ and $68_2$. The elongated slots $69_1$ and $69_2$ function to retain hook 22a which provides support for release button 32. When release button 32, in latched condition, is pushed, button 32 pushes hook 22a and allows opposing ends defining hook 22a to pivot out of respective elongated slots $69_1$ and $69_2$, thus releasing a latch 88 (FIG. 2).

FIG. 1 shows slider 16 from the top. Slider 16 is provided to carry magnet 20 responsive to engagement with and partial and full insertion of a seat belt tongue or latch 88 (best shown in FIG. 2). Slider 16 includes a pair of tabs 70 and 72. Slider 16 further includes a cavity 74 (best shown in FIG. 3), which is configured to receive magnet 20. The lateral (side-to-side) width of cavity 74 is selected to be no greater than the predetermined width of opening 63. This allows cavity 74 to be disposed within opening 63 of buckle frame 14 during assembly. Tabs 70, 72 have a side-to-side lateral width that is no greater than the preselected width between the side rails $68_1$, $68_2$. Through the foregoing, tabs 70, 72 can slide on top of ledges 64, 66.

Figure 3:
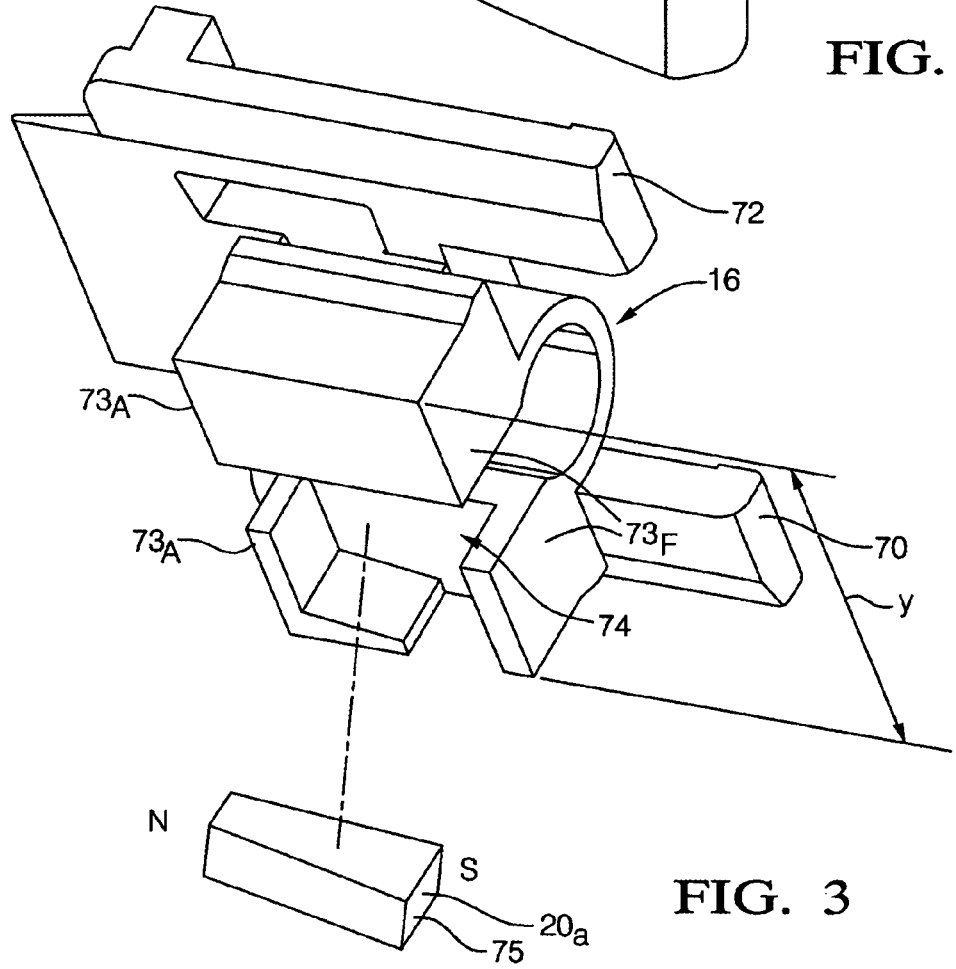
FIG. 3 is an exploded view of the slider and one magnet in accordance with the present invention.

FIG. 3 is an exploded, bottom view of slider 16 and its accommodation of magnet 20. Distance—y—indicates a maximum possible width of cavity 74 in order to fit through opening 63 of buckle frame 14. The forward and aft surfaces 73F and 73A respectively, of cavity 74 cooperate with the forward and aft edges of opening 63 to provide a mechanical stop feature, thereby defining the longitudinal travel of slider 16. Magnet 20 is orientated having a south pole thereof directed toward device 50 (direction of magnetization on an axis defining a length thereof). In other words, magnet 20 is configured and disposed relative to device 50 such that a south pole of the maximum magnetic field created by magnet 20 is most proximate to device 50.

The design of cavity 74 provides that magnet 20 is orientated such that an optimum magnetic field intensity is created to be sensed by device 50. More specifically, magnet 20 is oriented with respect to top surface of surface mounted device 50 wherein the north side of magnet 20 is distal while the south side of magnet 20 is proximate device 50. Moreover, the arrangement allows better use of the travel distance of the slider (i.e., the useful range over which a latch condition sensing can occur).

It should be understood that the orientation of magnet 20 as shown is exemplary only and not limiting in nature. Other orientations with respect to the placement of magnet 20 relative to slider 16 are achievable and are known to those of ordinary skill in the art and are consistent with the teachings of the present invention, which relate principally to the inventive arrangement. Nonetheless, the following may be taken as a non-limiting illustrated embodiment.

The location of magnet 20 when assembled with respect to slider 16 allows the Hall effect device 50 to align with magnet 20 when slider 16 moves from a first position (FIG. 4) where little or no tension is applied (since the tongue 88 is unlatched) to one of a plurality of second positions (FIGS. 5–8). A second position(s) may correspond to tension levels between zero (latched but no tension), to increasing levels of tension as the seat belt is cinched. During travel of slider 16, the Hall effect device 50 remains stationary in the bottom cover 12. The Hall effect device 50 will sense the strength of the magnetic field of the approaching magnet 20 as the magnet travels toward the Hall effect device 50. Corresponding to the strength of the magnetic field, the Hall effect device 50 will determine a binary latch condition of the seat belt (i.e., latched or unlatched), and will produce a signal that will determine whether or not to suppress any safety-related items 82 such as a hyper-tensioner, airbag, or pre-tensioner, etc. When a magnetic flux density as detected by the present invention does not exceed the pre-determined threshold, the system may be configured to suppress a passenger air bag. Alternatively, a control unit 80 may be configured to activate a corresponding passenger airbag when a sensed flux density is indicative of a non-positive latch condition.

In an exemplary embodiment, the Vcc of the Hall effect device 50 is 5 volts+/−0.5 volts DC. The voltage with no magnetic field present will be approximately 2.5 v. As the magnet is brought into the proximity of the Hall effect device, the voltage will increase to near Vcc or decrease to near ground, depending on the polarity of the magnet. Accordingly, as the voltage increases or decreases, so does the proximity of magnet 20 relative to device 50 indicative of a latch or unlatch condition of the seat belt. Of course, Vcc may have values greater than and less than 5 volts. In an exemplary embodiment, Hall effect device 50 is a programmable Hall switch allowing selection of a magnetic flux density in which the Hall switch is turned "on" when the Hall effect device 50 senses a flux density that exceeds the selected magnetic flux $B_{ON}$. Likewise, Hall effect device 50 is programmable to select a flux density $B_{OFF}$, at which the Hall switch 50 is switched "off". It will be recognized by one skilled in the pertinent art that although it is preferred that the Hall effect device is programmable, other Hall effect devices are contemplated using several types of switching Hall effect devices available which differ in their switching points and behavior to obtain desired switch "on" and "off" states.

With continued reference to FIG. 1, slots 60 and 62 allow hook 22 to hinge and thereby allow movement of the hook 22 when a latch (not shown) of the seat belt is inserted into assembly 10. Biasing members 24 and 26 provide biasing force and are held into place by a pair of tabs 41 and 43 of hook 22 and a pair of hooks $65_1$ and $65_2$ (not shown) located on either side of buckle frame 14. Biasing members 24 and 26 can be of either compression or tension type. Biasing members 24 and 26 provide the urging force that slider 16 must overcome in order to move from a first position to a second position (as described above).

In an exemplary embodiment, the biasing force of the members 24 and 26 is overcome when a force of about 5 to about 15 pounds is applied therefore causing slider 16 to move into the second position (FIGS. 5–8). Of course, and as such applications may require, the biasing force of members 24 and 26 to become overcome may vary. Accordingly, and when the urging force of members 24 and 26 are overcome, slider 16 travels towards the Hall effect device 50 and magnet 20 creates a magnetic field around the Hall effect device 50 causing a resulting signal to be sent through a plurality of wires 78 and sent to the control unit 80 indicative of positive latch engagement of the seat belt.

FIG. 1 also shows hook 22a including wing like structures $23_1$ and $23_2$ which protrude out from elongated slots $69_1$ and $69_2$ (when assembled) and glide in a back and forth like manner when release button 32 is activated. Spring 30 is placed between hook 22a on tab 25 and stub 86 of hook 22 which allows movement of the release button 32.

Once release button 32 is in place, upper cover 34 snaps over bottom cover 12 and the integral seat belt sensor assembly is complete. Accordingly, the seat belt sensor assembly 10 is easily assembled.

Figure 4:
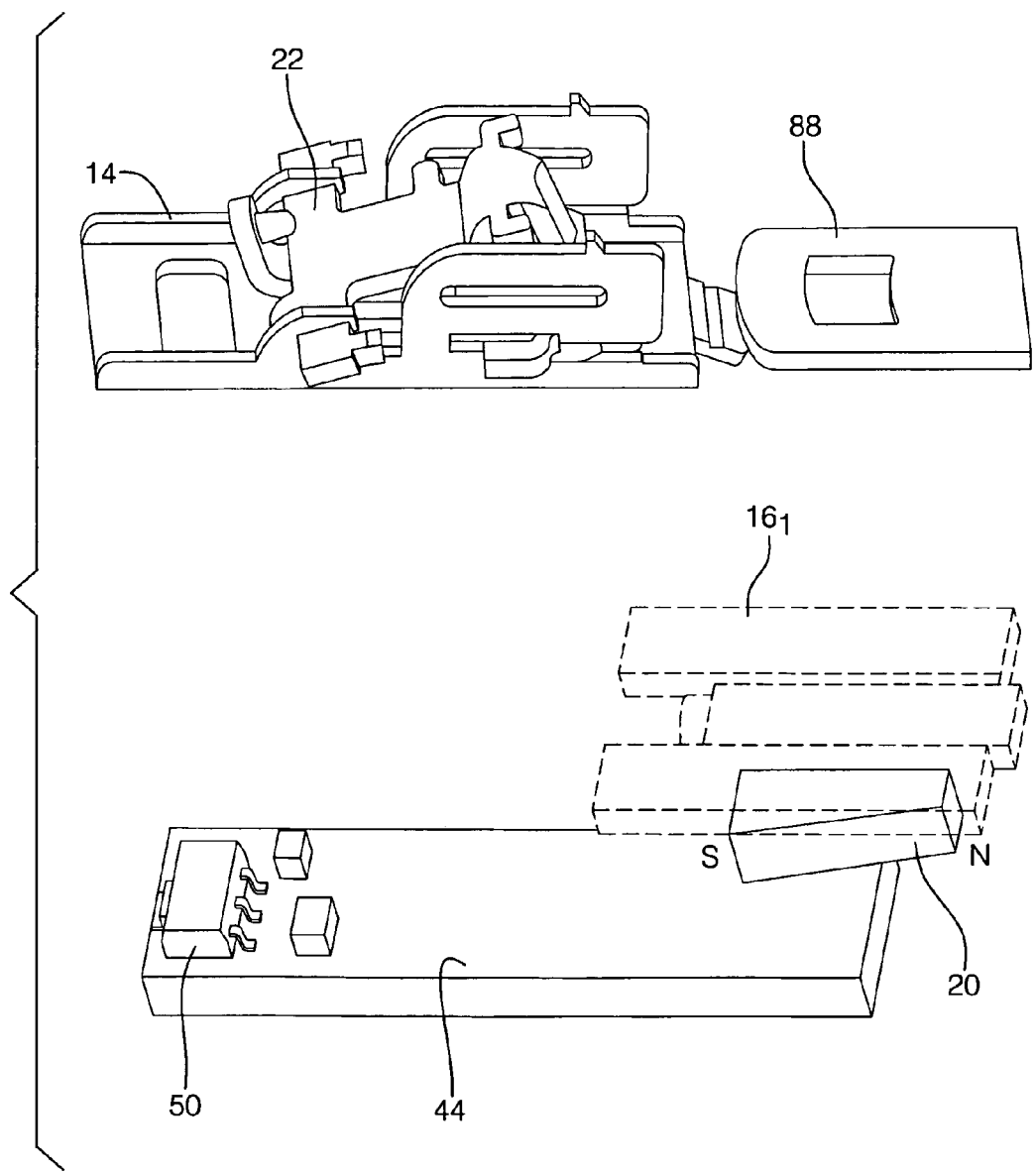
FIG. 4 is an exploded view of the seat belt sensor assembly in the unlatched position.

Referring now to FIG. 4, an exploded view of the seat belt sensor assembly 10 in an unlatched position is provided. When latch 88 is on the outside of sensor assembly, hook 22, hinged at buckle frame 14, is in the upright position as shown. The unlatched position allows slider $16_1$, accommodating magnet 20, to be urged into the first position through spring 18. When the slider $16_1$ is at the first position, magnet 20 is located away from Hall effect device 50 of PCB 44. Hall effect device 50 is capable of reading the magnet field created by magnet 20 or more accurately, sensing an absence of a magnetic field from distal magnet 20 and registers a signal corresponding to the unlatched position. This signal may provide information to control unit 80 warning the driver to latch the seat belt via light 87 (FIG. 1), for example, when the vehicle is in use.

Figure 5:
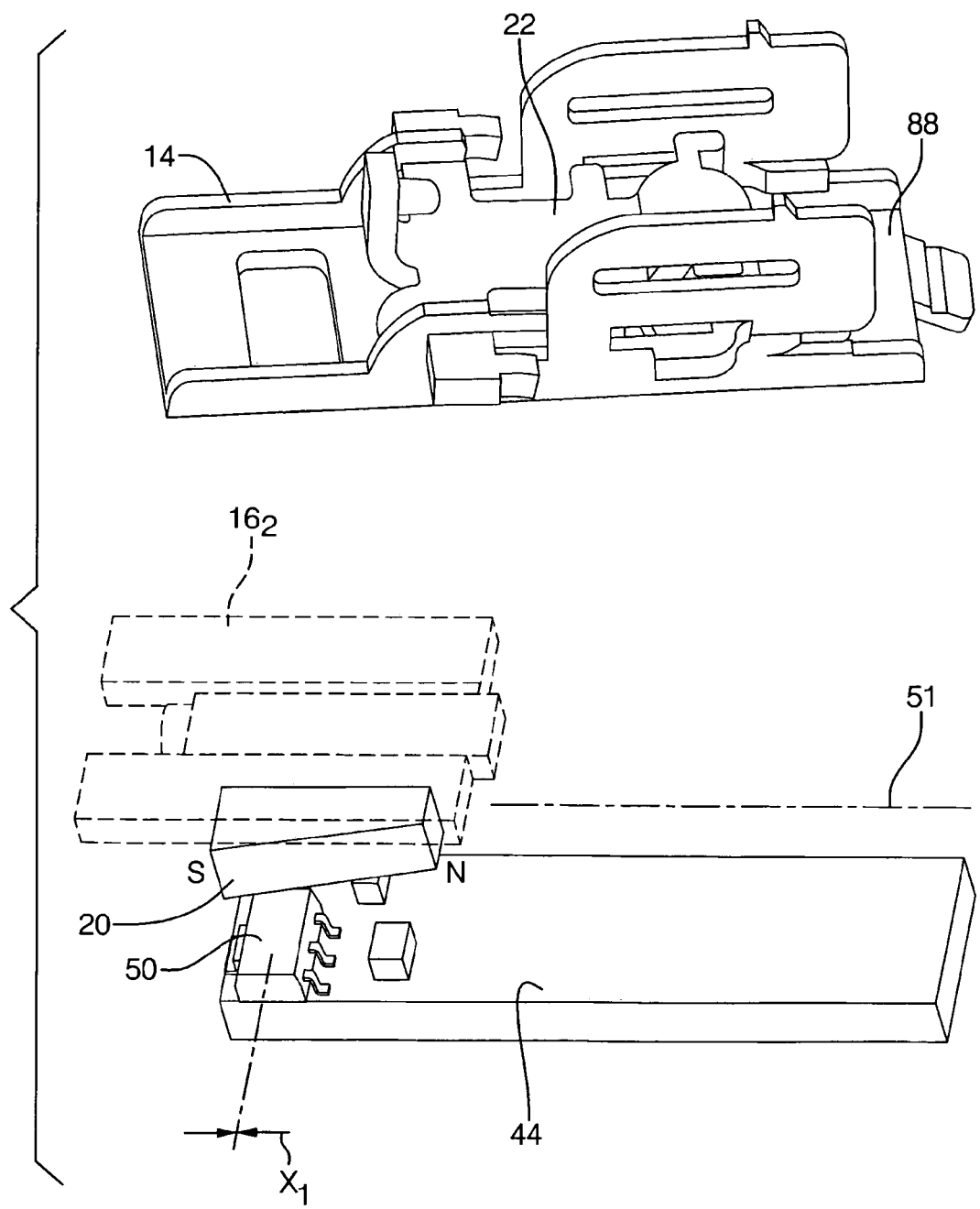
FIG. 5 is an exploded view of the seat belt sensor assembly in a first latched position with a first amount of tension applied, namely zero tension.

FIG. 5 represents an exploded view of the seat belt sensor assembly 10 in the latched position, with zero tension. When latch 88 is inside sensor assembly 10, hook 22 hinged at buckle frame 14 is in the closed position as shown in the upper part of FIG. 5. The latched position causes slider 16 at a second position $16_2$ specifically the magnet 20 thereof, to be substantially aligned with Hall effect device 50. Measurement $X_1$ is arbitrarily selected for purposes of illustration to place magnet 20 at a certain distance from central portion of Hall effect device 50. This distance registers a certain magnetic field strength whereby Hall effect device 50 produces an output signal accordingly. At this position, the magnetic field intensity sensed by Hall effect device 50 is at a maximum with respect to travel between the first and second positions along axis 51.

When the slider is at the second position $16_2$, a south pole end of magnet 20 is located above and proximate Hall effect device 50 of PCB 44. Hall effect device 50 is capable of reading the magnet field created by magnet 20 to sense the presence of a magnetic field from magnet 20 and registers a signal corresponding to the position indicative of a positive latch condition. This signal may provide information to control unit 80 notifying the driver of positive latch engagement via light 87 (FIG. 1), for example, being turned off when the vehicle is in use. Hall effect device 50 is preferably programmable to switch from "off" to "on" at a selected flux density value created by magnet 20 aligned therewith indicative of a latch condition. Hall effect device 50 remains "on" as magnet 20 moves away from and out of alignment with Hall effect device 50 as tension is increased until the reducing flux density reaches a value indicative of an unlatch condition, at which point Hall effect device 50 changes state from "on" to "off".

Figure 6:
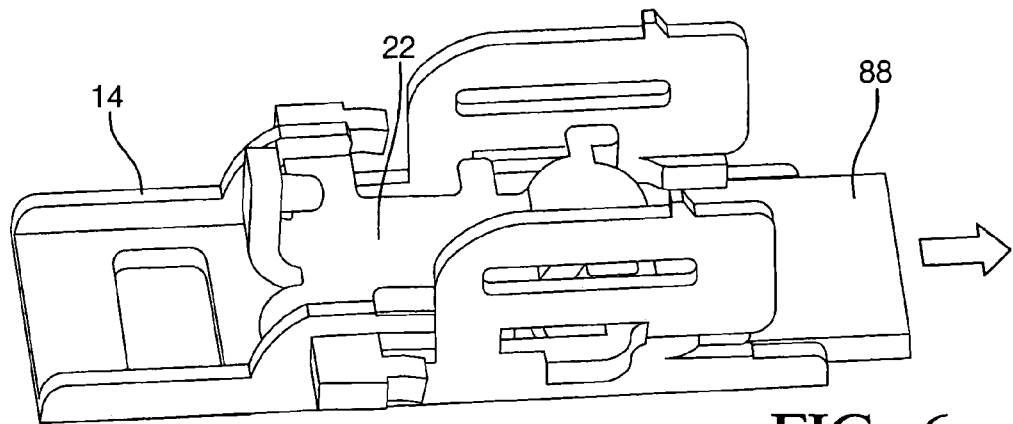
FIG. 6 is an exploded view of the seat belt sensor assembly in a second latched position with a second amount of tension applied.

FIG. 6 shows tension is applied to the seat belt (not shown). Latch 88 moves in the direction of the arrow thereby creating a force necessary to move slider 16 away from position $16_2$ toward position $16_3$.

Figure 7:
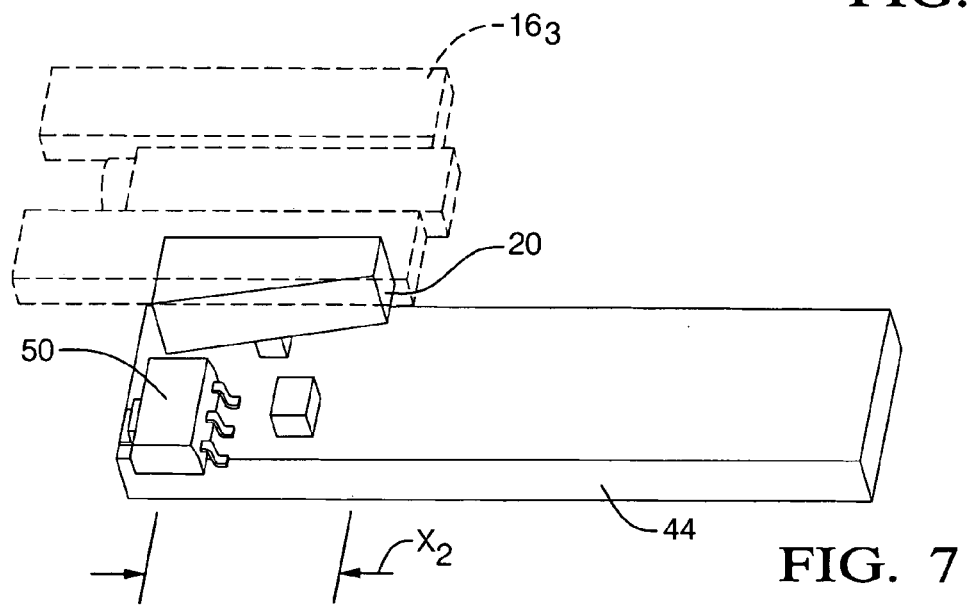
FIG. 7 is an exploded view showing a Hall effect device and magnets in a position corresponding to the second latched position of FIG. 8.

FIG. 7 shows slider in position $16_3$. Distance $X_2$ places magnet 20, residing in slider at position $16_3$, at a certain distance from the Hall effect device 50. This distance $X_2$ corresponds to a certain tension applied via latch 88. The relative position of Hall effect device 50 and magnet 20 registers a certain magnetic field strength whereby Hall effect device 50 produces an output signal that corresponds to the intensity of the magnetic field created by the location of magnet 20. However, this field strength is above a threshold value for switching Hall effect device 50 from the "on" state to the "off" state indicating an unlatch condition.

Figure 8:
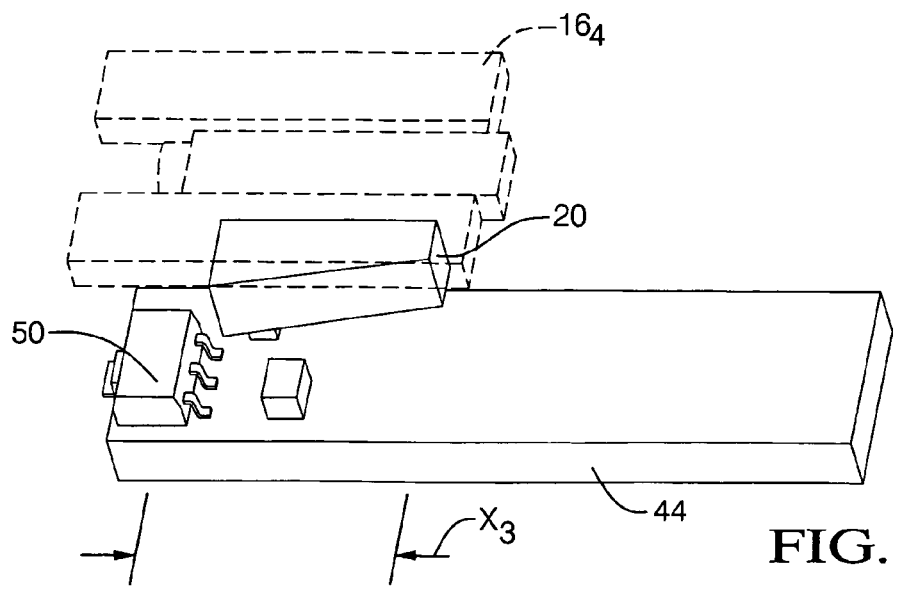
FIG. 8 is an exploded view showing the magnet in a position corresponding to a third latched position and with a third amount of tension applied.

If additional tension is applied, as illustrated in FIG. 8, distance $X_3$ places magnet 20, residing in slider $16_4$ at a distance defined by $X_3$ from the front edge of Hall effect device 50. However, again, the field strength associated with this distance is above a threshold value for switching Hall effect device 50 from the "on" state to the "off" state indicating an unlatch condition.

Many tension levels can be created when tongue 88 is pulled and tightened, therefore measurements of $X_2$ and $X_3$ illustrate but a few of the plurality of possible tension measurements that may occur when operating the seat belt sensor assembly, while remaining in a latch condition.

Figure 9:
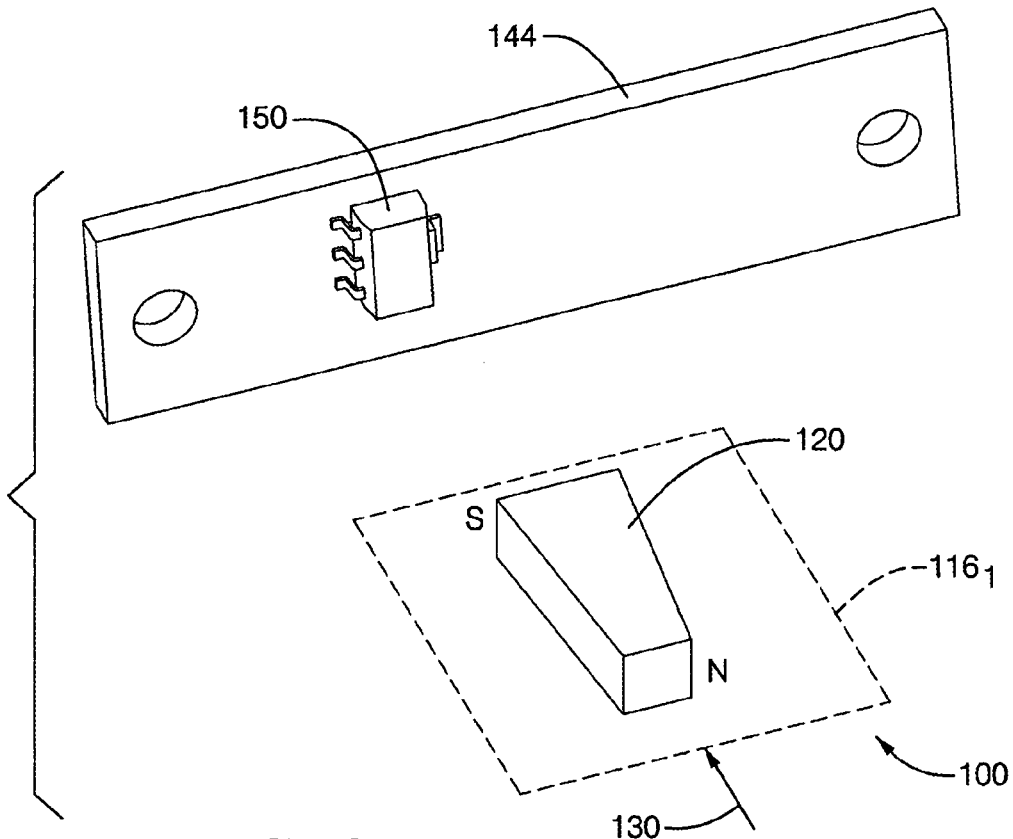
FIG. 9 is a perspective view of an alternative embodiment showing one magnet oriented in a different position with respect to the Hall effect device mounted to a PCB of the seat belt sensor assembly in the unlatched position.
Figure 10:
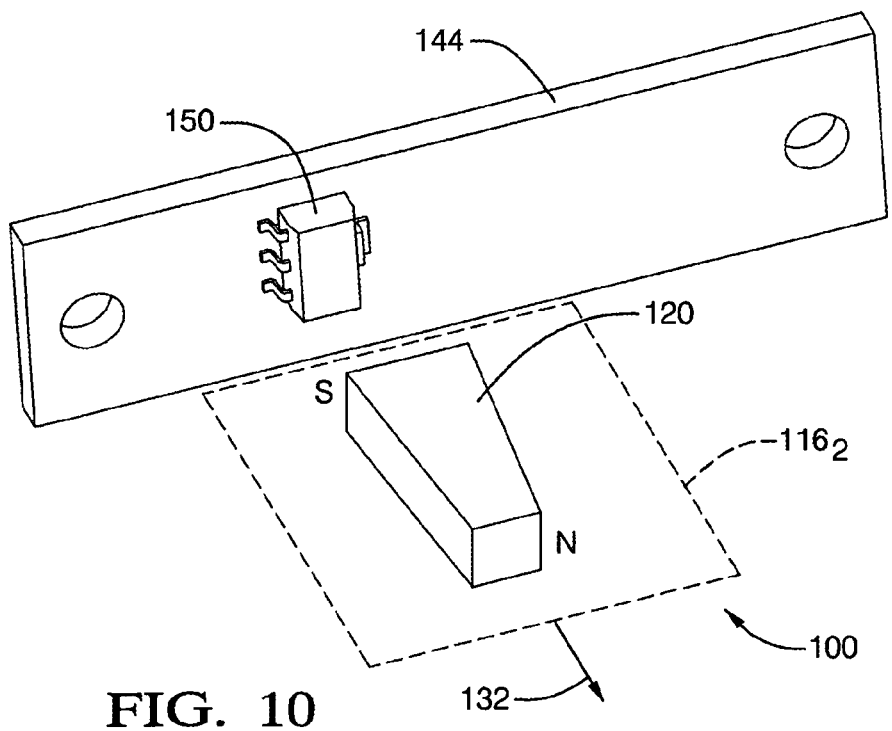
FIG. 10 is a perspective view of the alternative embodiment of FIG. 9 illustrating the magnet oriented with respect to the Hall effect device in a latched position.

Referring now to FIGS. 9 and 10, an alternative embodiment of a seat belt sensor assembly 100 having a contactless latch detector is illustrated. FIG. 9 illustrates an unlatch condition while FIG. 10 illustrates a positive latch condition indicative of positive engagement between latch 88 (not shown) and slider 116.

FIG. 9 illustrates a slider 116 in a first position at $116_1$ in an unlatched position. Slider 116 translates toward PCB 144 illustrated with arrow 130. In this manner, slider 116 is normal to a surface defining PCB 144 having device 150 extending therefrom. As latch 88 is brought into positive engagement with slider 116, magnet 120 is proximate Hall effect device 150 and aligned therewith, as illustrated in FIG. 10. In this second position at $116_2$, magnet 120 creates a magnetic flux density to turn "on" device 150 indicative of a positive latch condition. In this state, device 150 senses positive latch engagement and magnet 120 then moves in a direction indicated by arrow 132 when tension is applied.

When slider 116 is at the second position $116_2$, magnet 120 is located proximate Hall effect device 150 of PCB 144 and magnet 120 is aligned therewith. Hall effect device 150 is capable of reading the magnet field created by magnet 120 to sense the presence of a magnetic field from magnet 120 and registers a signal corresponding to the position indicative of a positive latch condition. This signal may provide information to control unit 80 notifying the driver of positive latch engagement via light 87 (FIG. 1), for example, being turned off when the vehicle is in use. Hall effect device 150 is preferably programmable to switch from "off" to "on" at a selected flux density value created by magnet 120 aligned therewith indicative of a latch condition. Hall effect device 150 remains "on" as magnet 120 moves away from and out of alignment with Hall effect device 150 as tension is increased until the reducing flux density reaches a value indicative of an unlatch condition, at which point Hall effect device 150 changes state from "on" to "off".

FIG. 10 shows tension applied to the seat belt (not shown). Latch 88 moves in the direction of arrow 132 thereby creating a force necessary to move slider 116 away from position 116$_1$ toward position 116$_2$.

By eliminating a mechanical contact switch to indicate a positive latch condition that is subject to wear resulting in failure, and using a seat belt slider magnet in conjunction with a Hall effect device to detect latch engagement, a potential failure mode is eliminated and less parts are employed.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A buckle and sensor assembly for a seat belt having a tongue, comprising:
   a housing configured to receive the tongue therein;
   a slider slidably received within said housing, said slider being configured for movement between a first position and a second position within said housing, said slider being moved toward said second position when at least a portion of said tongue directly engages said slider when said tongue is inserted into said housing;
   a single magnet coupled to said slider for slidable movement therewith; and
   a Hall effect device being disposed at a fixed location within said housing, said single magnet being moved toward said Hall effect device when said slider is moved toward said second position, said single magnet configured to induce said Hall effect device to output an output signal when said slider is disposed at said second position, said output signal indicating insertion of at least a portion of said tongue within said housing.

2. The buckle and sensor assembly of claim 1 further comprising:
   a biasing member for providing an urging force to said slider, said urging force urging said slider into said first position.

3. The buckle and sensor assembly of claim 1 wherein said housing further comprises a hook to accept said tongue.

4. The buckle and sensor assembly of claim 1 wherein said slider is adapted for receiving force from said tongue.

5. The buckle and sensor assembly of claim 1 wherein said Hall effect device is programmable.

6. A buckle and sensor assembly for a seat belt having a tongue, comprising:
   a housing configured to receive a tongue therein;
   a slider slidably received within said housing, said slider being configured for movement between a first position and a second position within said housing, said slider being moved toward said second position when at least a portion of said tongue directly contacts said slider when said tongue is inserted into said housing;
   a single magnet coupled to said slider for slidable movement therewith; and
   a Hall effect device being disposed at a fixed location within said housing, said single magnet being moved toward said Hall effect device when said slider is moved toward said second position, said single magnet configured to induce said Hall effect device to output an output signal when said slider is disposed at said second position, said output signal indicating insertion of at least a portion of said tongue within said housing, said output signal being received by a control unit.

7. The buckle and sensor assembly of claim 6 wherein said control unit is configured to control operation of a lighting device in response to said output signal.

8. A method for determining engagement of a seat belt tongue within a buckle assembly, said buckle assembly having a housing configured to receive the tongue therein, said buckle assembly further having a slider slidably received within said housing, said slider being configured for movement between a first position and a second position within said housing when at least a portion of said tongue directly engages said slider when said tongue is inserted into said housing, said buckle assembly further having a single magnet coupled to said slider for slidable movement therewith, and a Hall effect device being disposed at a fixed location within said housing, the method comprising:
   moving said slider from said first position toward said second position within said housing when at least said portion of said tongue is inserted into said housing and directly engages said slider to induce said single magnet to move with said slider toward said Hall effect device; and
   outputting an output signal from said Hall effect device when said slider is disposed at said second position and said single magnet is proximate said Hall effect device, said output signal indicating engagement of said tongue within said housing.

9. The method of claim 8, further comprising controlling operation of a lighting device in response to said output signal.

10. The buckle and sensor assembly of claim 1, wherein the slider comprises first and second tab portions coupled together via an intermediate member, the intermediate member defining a cavity configured to receive the single magnet therein.

11. The buckle and sensor assembly of claim 10, further comprising a buckle frame disposed in the housing configured to receive the slider thereon, the buckle frame having a first surface, the buckle frame being configured to allow first and second tab portions of the slider to slide on the first surface.

12. The buckle and sensor assembly of claim 11, wherein the single magnet is disposed in an opening extending through the buckle frame, during slidable movement of the slider.

* * * * *